C. A. F. DUCORRON.
TRANSMISSION CONTROL.
APPLICATION FILED FEB. 12, 1917.

1,268,699.

Patented June 4, 1918
4 SHEETS—SHEET 2.

INVENTOR
CHARLES. A.F. DUCORRON.
by Hazard and Miller
ATTORNEYS:

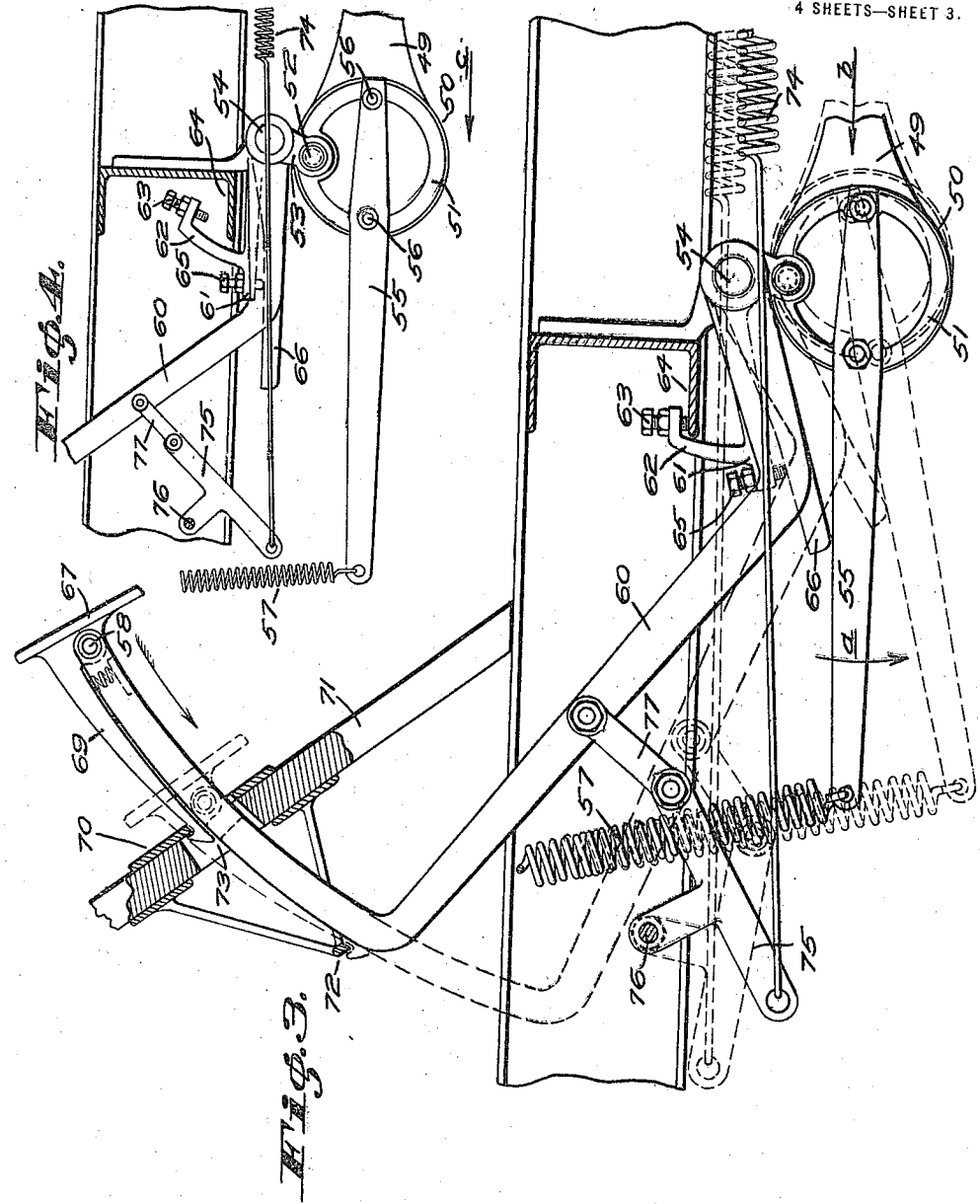

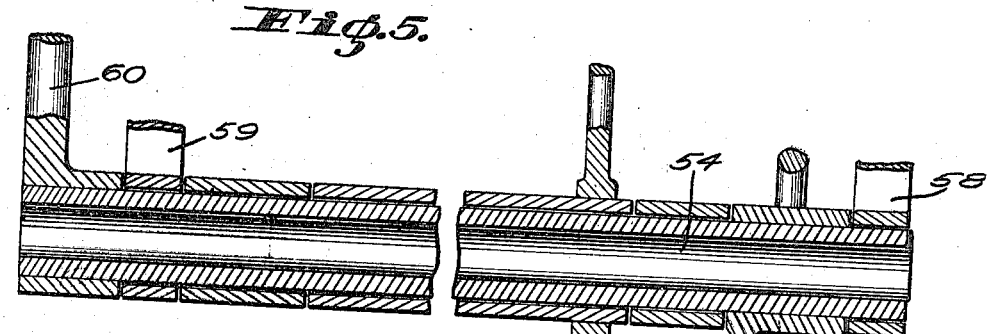
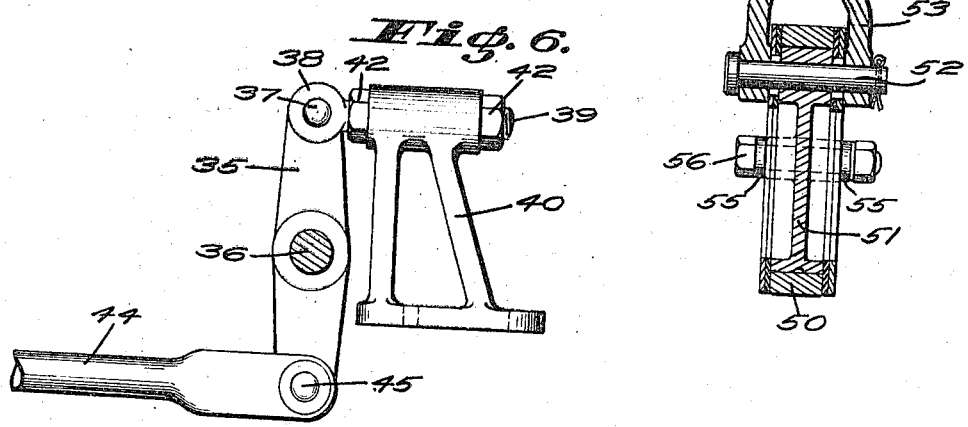
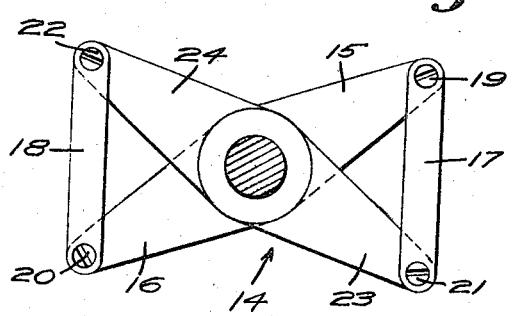

UNITED STATES PATENT OFFICE.

CHARLES A. F. DUCORRON, OF LOS ANGELES, CALIFORNIA, ASSIGNOR TO HOMER LAUGHLIN ENGINEERS CORPORATION, OF LOS ANGELES, CALIFORNIA, A CORPORATION OF CALIFORNIA.

TRANSMISSION CONTROL.

1,268,699.      Specification of Letters Patent.      Patented June 4, 1918.

Application filed February 12, 1917. Serial No. 148,164.

*To all whom it may concern:*

Be it known that I, CHARLES A. F. DUCORRON, a citizen of the United States, residing at Los Angeles, in the county of Los Angeles and State of California, have invented new and useful Improvements in Transmission Controls, of which the following is a specification.

This invention relates to a transmission control and particularly pertains to a control for the friction drive members used in connection with the friction transmission of an automobile engine.

It has been one of the great difficulties encountered in the use of friction power transmission to provide an excessive initial pressure between the driving and driven members of the transmission and to allow a reduced pressure to exist between the members when the driven member has attained approximately the same speed as the driving member. This has been due to the fact that the coefficient of friction between the driving and driven members of the friction transmission is about one-third as great when there is considerable slip between the members as when both members are running together without appreciable slip.

It is an object of this invention to provide a mechanism which will act in a semi-automatic manner to apply a high initial pressure to the driving member of a friction transmission during the period of acceleration of the driven member up to a speed equal to that of the driving member and which may be operated to reduce the pressure again in direct ratio to the increased coefficient of friction or any predetermined lesser pressure when the driven member has attained the same speed as the driver.

Another object is to provide means within a friction transmission which will maintain the driving and driven members in an irreversible relation to each other and which will be held toward each other by uniform unyielding pressure.

Another object of this invention is to provide means whereby the driving and driven members of a friction transmission will be held in rigid relation to each other irrespective of the amount of pressure being exerted between them, so as to avoid unequal wear.

Another object is to provide a device of the above character which is so constructed that it does not require constant readjustment and affords considerable wear between them.

Another object is to provide means within a friction transmission which will maintain the driving and driven members in an irreversible relation to each other and which will be held toward each other by uniform unyielding pressure.

Another object of this invention is to provide means whereby the driving and driven members of a friction transmission will be held in rigid relation to each other irrespective of the amount of pressure being exerted between them.

Another object is to provide a device of the above character which is so constructed that it does not require constant readjustment and affords considerable wear between the driving and driven parts without impairing the operation of the transmission.

Another object is to provide a friction transmission control mechanism which will act in a manner to compensate for improper adjustment of the driving and driven members of the transmission in relation to each other without increasing the pressure between the two or producing undue strain upon any of the parts of the mechanism involved.

It is a further object to provide a clutch mechanism for accomplishing the above results and which is simple in its construction and may be readily operated by the movement of a single operating lever.

Other objects will appear hereinafter.

The invention is illustrated, by way of example, in the accompanying drawings in which:

Fig. 3 is an enlarged view in side elevation illustrating the foot control mechanism and shows the normal running position of the members in solid lines and further illustrates the declutched position in dotted lines.

Fig. 4 is a view drawn on a reduced scale and illustrates the starting position of the foot pedal mechanism.

Fig. 5 is a view in horizontal section as seen on the line 5—5 of Fig. 1 and particularly illustrates the foot pedal mounting and its connection with the shifting eccentric.

Fig. 6 is a view in elevation as seen on the line 6—6 of Fig. 1 and as viewed in the direction of the arrows and particularly illustrates the actuating mechanism provided the disk supporting arms.

Fig. 7 is a view in section and elevation as seen on the lines 7—7 of Fig. 1 viewed in the directions of the arrows and disclosing the yieldable connection between the engine crank shaft and the driving member of the transmission.

Figure 1:
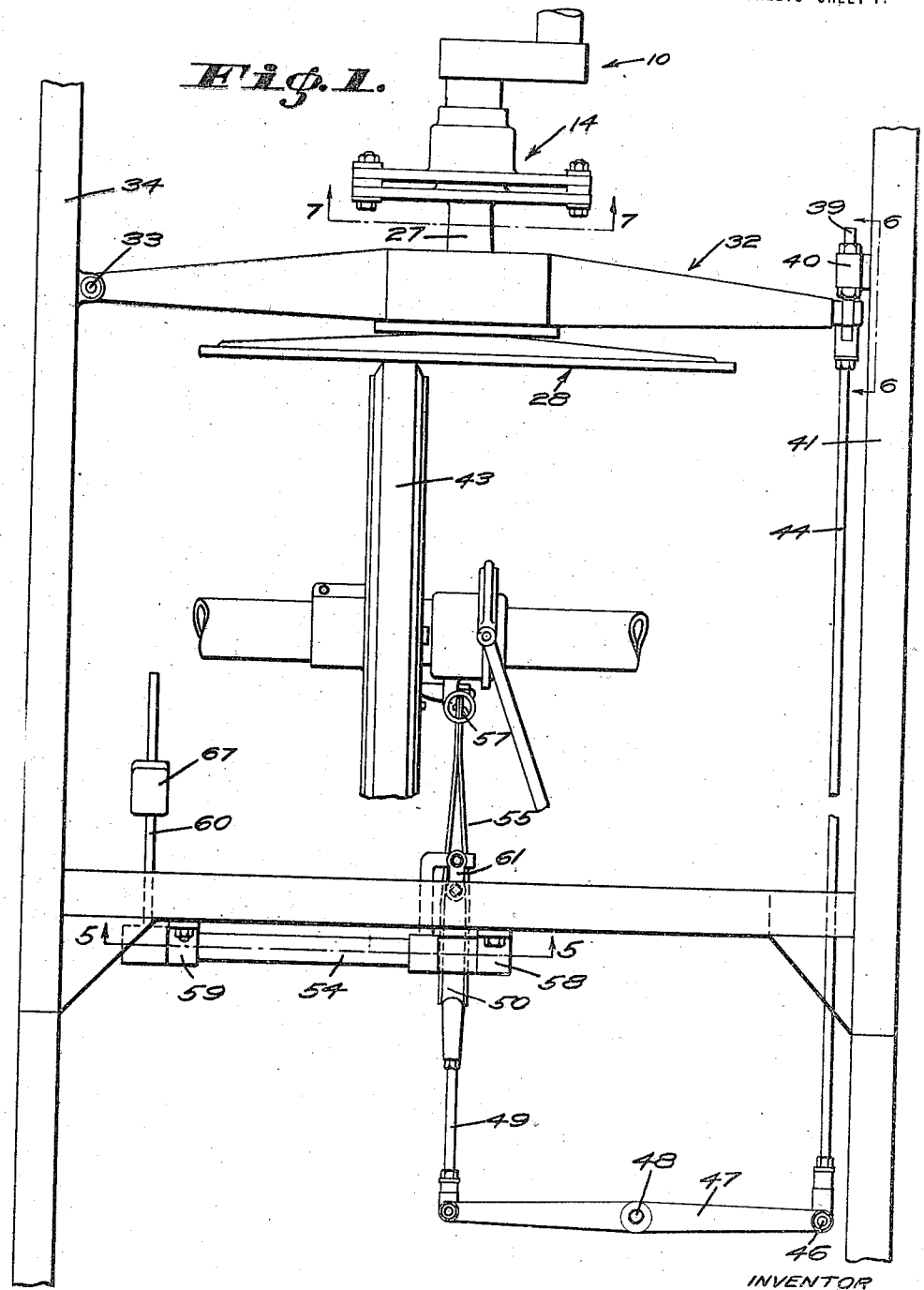
Figure 1 is a view in plan illustrating the vital parts of the friction control mechanism as connected to the crank of an automobile engine and as mounted upon an automobile frame.
Figure 2:
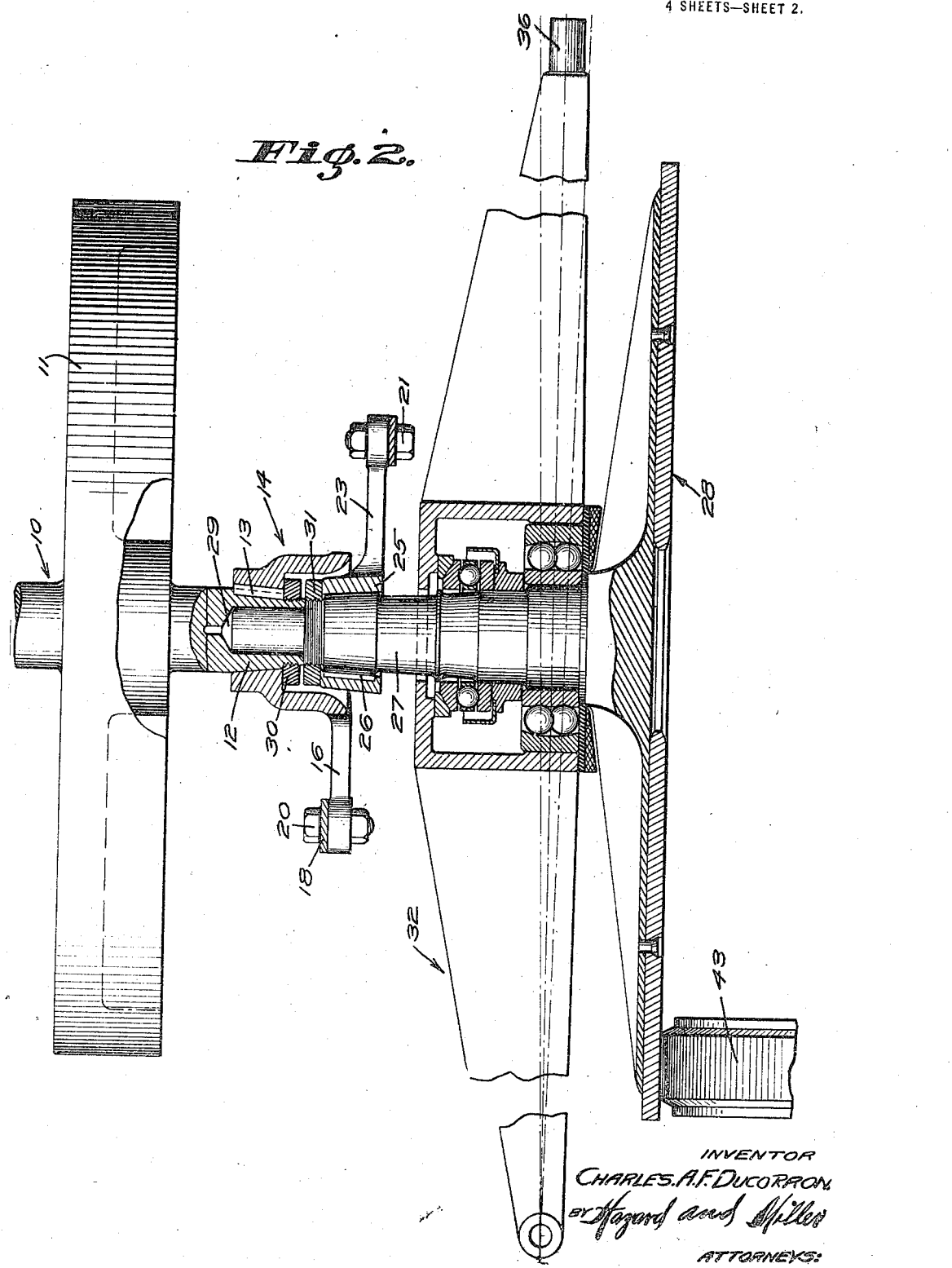
Fig. 2 is an enlarged view in section and elevation illustrating the pivotal and yieldable mounting provided the friction driving disk when driven by the crank shaft of an engine.

Referring more particularly to the drawings, 10 indicates the crank shaft of an engine, which as shown in Fig. 2 is fitted with a fly wheel 11 of a suitable design. The end of the crank shaft 10 projects through the fly wheel and is formed with an externally tapered portion 12 upon which is secured, against rotation, by means of a key 13, a driving coupling 14. The coupling member 14 is formed with a pair of alined oppositely disposed arms 15 and 16 to the outer ends of which are secured resilient driving straps 17 and 18. These straps are detachably secured at the ends of these arms by bolts 19 and 20 and are secured by bolts 21 and 22 to the outer ends of arms 23 and 24 of coupling member 25. The coupling 25 is secured, by means of a key 26, to the spindle 27 of the frictional driving disk 28. The outer end of the spindle 27 projects into a counterbore 29 formed within the end of the crank shaft portion 12. The two coupling members 14 and 25 are properly held by lock nuts 30 and 31 and thus may be readily removed and replaced.

The friction disk 28 and its spindle 27 are mounted within and entirely supported by a swinging supporting arm 32 which is pivoted upon a pin 33 to the side frame member 34 of the vehicle frame. The opposite end of the arm is movably supported by a swinging lever 35 within which the end 36 of the arm projects and is free to move. The lever 35 is pivotally suspended from a pin 37 mounted within the eye 38 of a bolt 39. The bolt 39 is pivotally and adjustably secured within a supporting bracket 40 which is fixed upon the side frame member 41 of the vehicle. A pair of lock nuts 41 and 42 are mounted upon the external threaded end portions of the bolt 39 and secure it within the bearing of the bracket 40, by means of the swinging movement afforded the supporting arm 32 the driving disk 28 is moved toward and away from a driven disk 43 which is positioned at right angles to the face of the driving disk and bears peripherally thereagainst.

The supporting arm 32 is swung by the lever 35 which engages the end 36 of the arm and which is connected at its lower end to a shifting rod 44. This rod is pivoted to the lever 35 by a pin 45 and extends horizontally and at right angles to the driving disk and also to a pivot pin 46 which engages one end of a rocking lever 47. The lever 47 is pivoted intermediate its ends upon a pivot pin 48 suitably secured to the vehicle frame. The inwardly extending end of lever 47 is engaged by a draw arm 49 which extends parallel to the rod 44 and in a direction toward the driving mechanism. This arm is formed with an enlarged vertically disposed end portion having a thin cylindrical wall 50 within which eccentric sheave 51 is rotatably mounted. The rod and sheave are pivotally supported by a pin 52 from the downwardly extending short arm 53 of a bell crank which is vertically mounted upon a supporting shaft 54 and which serves to produce a movement of the eccentric and the draw arm 49 to actuate the driving disk through a portion of its performance.

A pressure arm 55 is secured upon the face of the sheave 51 by means of bolt 56 and extends forward from the sheave and in a plane approximately parallel to the draw bar 49. The outer free end of the pressure arm 55 is yieldably supported by a pressure spring 57 which is suitably anchored to the vehicle frame and which exerts a pressure tending to maintain the arms 49 and 55 in a horizontally alined position. Attention is directed to the fact that the periphery of the eccentric sheave is frictionally engaged throughout the circumference of the enlarged end portion 50 of the arm 49 and thus offers resistance to the rotation of the sheave therein for a purpose which will be hereafter set forth.

The arm 53 of the bell crank is bifurcated and extends downwardly upon opposite sides of the eccentric sheave 51 and as before stated is pivotally secured thereover by the pin 52. The supporting shaft 54 as particularly shown in Fig. 5 is hollow and is mounted upon the frame by means of bearing brackets 58 and 59. The bracket 58 is secured over the end of the shaft and against the side of the bell crank while the bracket 59 is secured over the shaft and against the hub of the foot pedal lever 60. The bell crank is free to move upon the shaft 54 and has an arm 61 which extends toward the front of the vehicle. This lever is formed with an upwardly extending arcuate limiting arm 62 having a lug at its end which is internally threaded to receive an adjusting screw 63 adapted to engage a limiting lug here shown as being on the leg 64 of a frame channel member. The action of this screw and lug is to prevent the downward movement of lever arm 61 beyond a given point. The outer end of the lever 61 is provided with an internally threaded bore adapted to receive an adjusting screw 65. The screw 65 is adapted to be engaged by the upper face of a trip lever 66 which is rigidly mounted upon the shaft 54 and which extends outwardly to bear upon the upper edge of the pressure arm 65. This arrangement provides a correlated movement between the pressure arm 55, the trip arm 66 and the bell crank composed of the lever arms 53 and 61.

The shaft 54 is adapted to be rotated by the foot lever 60 when power is exerted in a downward direction upon the foot pedal 67. The pedal 67 is mounted at the outer end of the shaft upon a pivot pin 58 and is formed with a downward extending pawl 69 which is adapted to successively engage lock plate 70 mounted upon the foot board 71 of the vehicle and a locking lug 72 mounted beneath the foot board. These two pawl engaging members are provided to limit upward movement of the lever 60 and thereby maintain the control mechanism in a desired position. The foot lever as is usual in automobile designs is formed with an arcuate portion provided to swing concentric with shaft 54 and through an opening 73 in the foot board. This portion on the lever is connected by a straight length and end length disposed at an angle thereto for convenience, and is secured to the shaft 54 by the end length. The lever 60 is adapted to be held in its uppermost position by means of a tension spring 74 which is suitably secured at one end to the vehicle frame and by the other end to the forwardly extending leg of a T-shaped lever 75 which is pivoted upon the frame of the vehicle by means of a pivot pin 76 secured to the perpendicular leg of the lever. The rearwardly extending leg of the lever which is an alinement with the forwardly extending leg is pivotally connected by means of a connecting link to the straight portion of the lever 60. The link 77 is of a length to prevent the lever arm to which it connects from becoming alined with it when in action and thereby insures that an upward pressure will be exerted upon the foot lever 60 by the spring 74 at all times.

The operation of the control mechanism is as follows:

When the vehicle is at rest and the engine is not running the clutch pedal 60 will be depressed to bring the parts into the position indicated by the dotted lines in Fig. 3. In this position the trip lever 66 will be in engagement with the pressure lever 55 and will force this lever in the direction indicated by the arrow —a— in Fig. 3. This movement will act to rotate the eccentric sheave around the pin 52 which secures the sheave to the arm 53 of the bell crank, the movement of rotation caused by this action will be determined directly upon the frictional engagement which exists between the periphery of the sheave and the encircling end portion of the draw bar 49. This action will take place due to the fact that the drawbar 49 and the operating levers and links connected therewith offer considerable resistance to the swinging movement of the foot-pedal and therefore to the eccentric. The cylindrical wall 50, which incloses the sheave 51 is of large diameter so that the pressure of the drawbar will be distributed over a large surface and a maximum amount of friction produced. This friction will act to prevent rotation of the sheave whether the drawbar is at rest or in motion. It will further be noted that, due to the frictional resistance of the sheave ring to the sheave, the action of the spring 57 will be opposed. There will be a point of counter-balance, however, between the drawbar pressure and the spring tension. This point is indicated in Fig. 3 where the bar and sheave arm are shown in solid lines. It will be evident that the drawbar and sheave will be held in a semi-rigid relation to each other by the resultant action of the drawbar pressure in opposition to the spring tension. In this manner rotation of the sheave will be resisted and will only take place after the pressure upon the foot-pedal has overcome the friction between the sheave and its ring sufficiently to cause it to turn independently of the ring. In the construction here shown these two parts have been formed of bronze which possesses a high coefficient of friction and does not readily wear. While the sheave is maintained in the position indicated by dotted lines in Fig. 3 the draw arm 49 will be forced rearwardly and will act through the rocker lever 47 to move the rod 44 in a reverse direction. The movement of this rod will swing the lever 35 upon its pin 37 and in turn swing the supporting arm 32 upon which the driving disk is connected away from the driven disk. It is evident that this action will relieve the pressure of the driven disk from the driving disk and will thereby cause them to become disengaged.

When the control mechanism is in the declutched position the pawl 69 formed integral with the foot pedal 67 will be in engagement with the locking lug 72. Pressure on the upper edge of the foot pedal will cause the pawl to become disengaged from the lug 72 and will allow the foot lever 60 to swing upwardly into the second or normal running position of the clutch. This position is indicated in solid lines in Fig. 3 of the drawings where the pressure arm 55 is shown as standing substantially in a horizontal plane and the eccentric sheave 51 is shown as depending directly below the pin 52. After the foot-pedal reaches this normal position the trip lever will come into contact with the adjusting screw 65 upon the end of the lever 61. It will be understood that previous to this time the lever 61 has been idle and the bell crank, of which it is a part, has been held in the solid line position of Fig. 3 by the tension produced by the clutch spring. This tension has caused the limiting arm to be held firmly against the leg 64 of the channel member, thereby establishing an axis of rotation for the sheave around the pin 52. It will be noted that there has been considerable transition in the positions occupied by the various parts and that in the normal running position the draw arm 49 is moved in the direction indicated by the arrow —b— in Fig. 3. This movement has effected the lever 47 and 35 to swing the supporting member 32 toward the driven wheel of the clutch and thereby press the face of the driving disk 28 against the periphery of the driven wheel 43. The amount of pressure exerted upon the wheel by the disk is determined by the tension provided by the pressure spring 57 which is secured to the outer end of the pressure arm 55. This tension is further regulated by the frictional engagement between the periphery of the eccentric shift 51 and the wall of the bore 50 formed within the end of the draw arm 49. The pressure exerted by these means is sufficient to produce a correct frictional engagement for the positive driving of the driven wheel 43 by the driving disk 28 after the former has attained approximately the speed of the latter.

The pressure thus provided the disk 28 against the wheel 43 is only sufficient to prevent slippage between the frictional members when they are running at equal speed and is not sufficient to insure engagement between these parts when starting under load. For this reason an additional position is provided the control members and the foot lever 60 so that added pressure may be had between the friction members at starting. In actual practice it has been found that approximately three times the pressure is required to stop slippage between the driving and driven frictional members when the driver runs faster than the driven as is required after the latter has attained the speed of the driver. This required pressure is produced by releasing the pawl 69 from engagement with the plate 70 by which it was held in its second position and allowing the spring 74 to draw it into the position indicated in Fig. 4 of the drawings. When the foot lever 60 moves to this uppermost position it will actuate the trip lever 66 secured to the shaft 54 and will move it upwardly until it is engaged by the adjusting screw 65 mounted within the end of the lever arm 61 of the bell crank. As the lever continues to move upwardly it will raise the arm 61 and relieve the pressure of the adjusting screw 63 from the plate 64 at the same time swinging the arm 53 of the bell crank lever in a forward direction and in this manner moving the eccentric sheave forward without rotation. The eccentric sheave 51 is maintained in its normal position with the pressure arm standing horizontal by the action of the spring 57. It will be noted that the movement of the bell crank levers and the forward movement to the sheave will draw the arm 49 forward in the direction indicated by arrow —c— on Fig. 4 and will in so doing exert an increased pressure upon the friction wheel 43 by the friction disk 28 and will thereby cause them to run without slippage, the eccentric sheave being prevented from releasing this extra pressure by the frictional resistance between the sheave and its strap while it still provides relief from such accidental excessive pressure as might otherwise cause damage to the mechanism.

This control mechanism is dependent upon the spring actions for its successful operation. The action of the resilient straps 17 and 18 which connect the coupling members 14 and 26 interposed between the engine and the driving disk causes the arm 32 to be free to move throughout a horizontal plane and also provides a back pressure which tends to maintain the disk 28 in its normal declutched position. The pressure spring 57 acts to control the clutch mechanism and to maintain it under a given pressure. It will be noted that the pressure spring 57 does not act directly upon the disk 28 and therefore does not provide a vacillating pressure upon the driving wheel 43 but merely performs its function to maintain the elements of the mechanism in equilibrium at all times. Attention is further directed to the fact that the spring action of the resilient straps 17 and 18 and the spring 57 places the entire mechanism under continuous tension and thus insures against lost motion or rattle within the various joints and connections. The spring 74 performs the sole function of providing the foot lever 60 with a resilient support and is connected thereto by means of the peculiar lever 76 and link 77 so that lever 60 will be depressed against a constant pressure and will not require greater pressure as the lever lowers due to the increased tension of the spring 74 as it elongates.

It will be noted that variation in the diameter of the driven wheel 43 may be accommodated by the adjustment of the adjusting nuts 41 and 42 on the eyebolt 39. By the adjustment of this element the two frictional members may be afforded proper engagement at all times. The arrangement of the trip lever 66 in relation to the pressure arm 55 is such that considerable latitude may be allowed in the wear of the frictional members without the necessity of adjustment.

One of the difficulties experienced in friction drives has been that members have been provided with a resilient yieldable pressure and this has caused the driven wheel to become ovalized under ordinary wear. This has been obviated in this device by the peculiar arrangement of the levers and rods so that slight inequalities in the frictional surfaces of the members 28 and 43 will be absorbed within the mechanism and with such rapid movement that the disk will remain practically insensitive to them. In fact experience has proved that when a wheel had become ovalized due to some legitimate cause the mechanism involved in the present invention has acted to correct the periphery of the wheel after a short run.

It will thus be seen that the transmission control mechanism here disclosed may be operated in a simple manner without confusion and will deliver a constant unyielding pressure against the driving disk by the driven disk and will allow a given increase in pressure to be applied between these disks when necessary.

I claim:

1. In a transmission control, the combination with a friction driving disk, of a driven wheel adapted to peripherally engage the face of the driving disk and be frictionally driven thereby, means for moving the friction disk toward and away from the driving disk, a control mechanism adapted to be actuated to move the driving disk, and means operated by the control mechanism whereby its movement will produce a predetermined movement of the friction disk.

2. In a transmission control, the combination with a rotatable engine shaft, of a friction disk driven thereby and a friction wheel in driving engagement with the friction disk, flexible connecting means interposed between the engine shaft and the friction disk whereby relative longitudinal movement may be had between the face of the friction disk and the circumference of the friction wheel, means for moving the friction disk throughout said range of movement, control means for operating the moving means whereby the friction disk may be given predetermined movement in relation to the friction wheel, and a yieldable connection between said moving and control means whereby back pressure of the friction disk will be absorbed.

3. In a transmission control, the combination with a rotatable driving shaft, of a friction disk adapted to be rotated thereby, yielding coupling means connecting the shaft and disk and allowing longitudinal movement of the disk, a friction wheel mounted to peripherally engage the face of the friction disk and be driven thereby, an actuating lever, a control mechanism adapted to be set by said actuating lever to positively produce a predetermined unyielding pressure by the friction disk against the friction wheel.

4. In a transmission control, the combination with a rotatable driving shaft, of a friction disk adapted to be rotated thereby, yieldable coupling means connecting the shaft and disk and allowing longitudinal movement of the disk, a friction wheel mounted to peripherally engage the face of the friction disk and be driven thereby, a swinging bearing within which the shaft of the friction disk is supported, an actuating mechanism adapted to act upon the swinging bearing to exert given pressures upon the periphery of the friction wheel by the friction disk, a control lever adapted to set said actuating mechanism and means whereby a given movement of the control lever will act to cause the actuating mechanism to produce a predetermined pressure between the friction disk and friction wheel.

5. In a transmission control, the combination with a rotatable driving shaft, of a friction disk adapted to be rotated thereby, a yieldable coupling connecting the shaft and disk in a flexible manner, a driven wheel mounted to frictionally engage the surface of the disk and be driven by said disk, a longitudinally swinging bearing adapted to support the friction disk, a control lever adapted to be set at predetermined points of its movement, a control mechanism actuated by said lever whereby predetermined pressures may be exerted upon the friction wheel by the friction disk corresponding to the points at which the lever is set, and a constant tension resilient means for opposing the movement of the control lever.

6. In a transmission control, the combination with a rotatable driving shaft, of a friction disk adapted to be rotated thereby, a flexible coupling adapted to connect the shaft and disk in a yieldable manner and whereby rotation may be imparted to the disk, a swinging bearing within which the disk is rotatably mounted, a control lever adapted to be set at predetermined points, an eccentric sheave adapted to be swung by the control lever, a control mechanism disposed to operate the swinging bearing and a friction disk supported thereby, means whereby movement of the eccentric sheave will cause said control mechanism to produce a predetermined pressure between the disk and the wheel, and means whereby the control lever may be moved to swing the eccentric sheave and produce an increased predetermined pressure between the friction disk and the friction wheel.

In testimony whereof I have signed my name to this specification.

C. A. F. DUCORRON.

Copies of this patent may be obtained for five cents each, by addressing the "Commissioner of Patents, Washington, D. C."